Feb. 18, 1941. H. W. BUELOW 2,231,880
BUILDING FRAME STRUCTURE
Filed Sept. 20, 1935 2 Sheets-Sheet 1
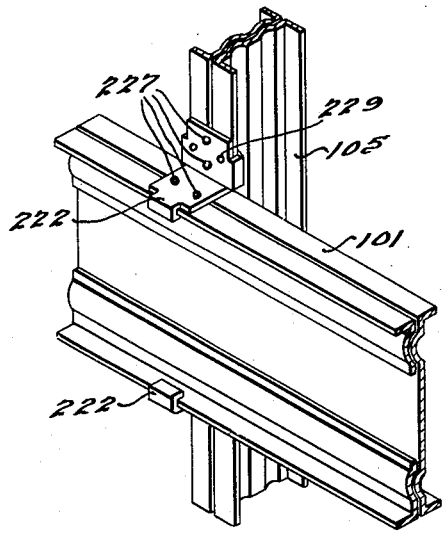
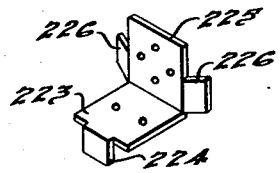
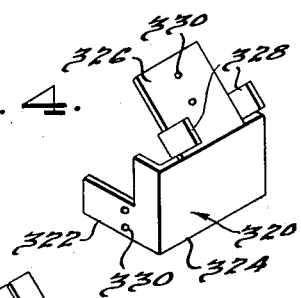
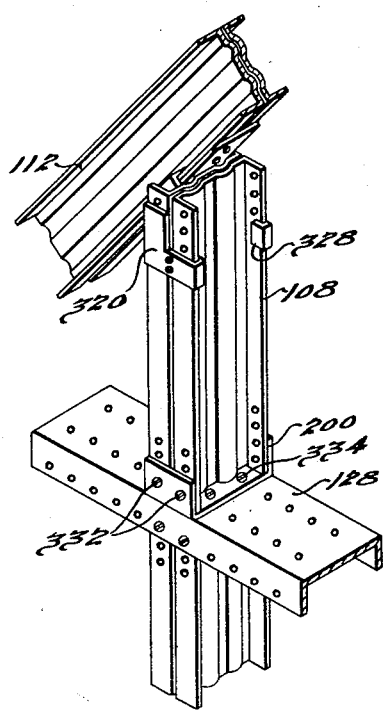
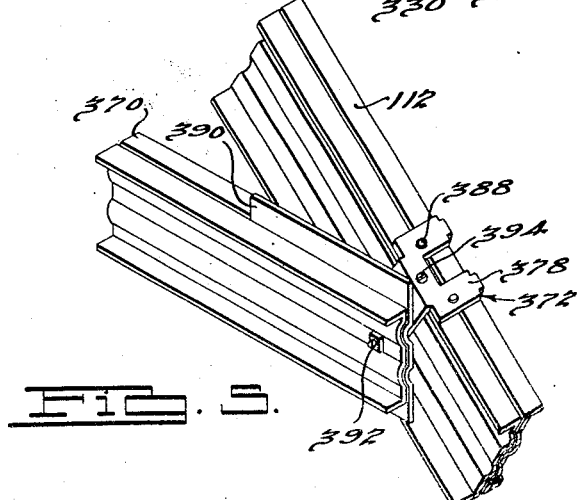
INVENTOR
Henry W. Buelow.
BY
Harness, Dickey & Pierce.
ATTORNEYS.

Feb. 18, 1941.     H. W. BUELOW     2,231,880
BUILDING FRAME STRUCTURE
Filed Sept. 20, 1935     2 Sheets-Sheet 2
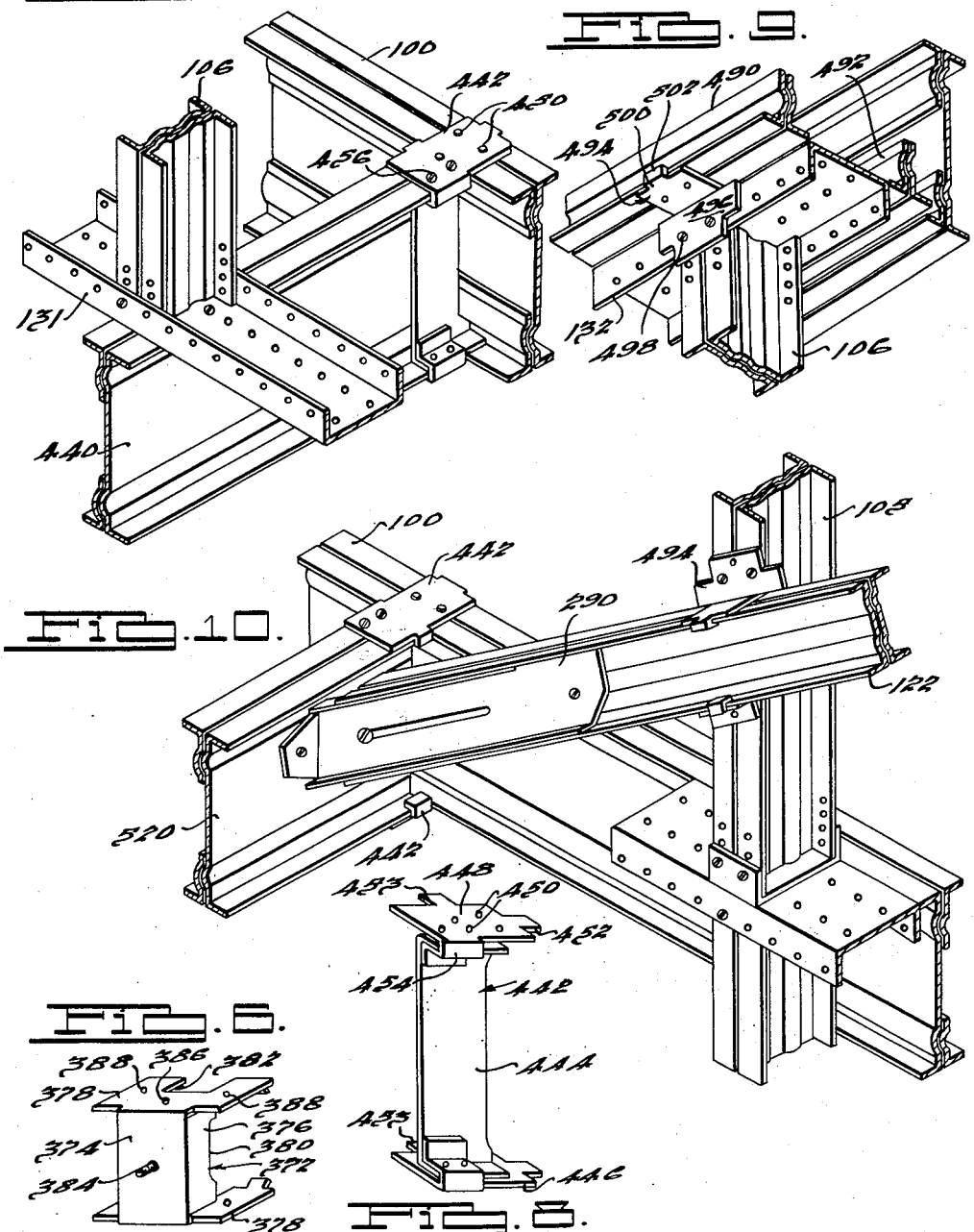

Patented Feb. 18, 1941

2,231,880

UNITED STATES PATENT OFFICE 2,231,880

BUILDING FRAME STRUCTURE

Henry W. Buelow, Detroit, Mich.

Application September 20, 1935, Serial No. 41,364

11 Claims. (Cl. 189—35)

The present invention relates to building frame structures, and particularly to the provision of a metal building frame structure embodying improved structural shapes and improved constructions of attaching elements for such shapes.

It is also an object of the present invention to provide improved structural member sections for use in metal framing and to provide improved attaching elements for use therewith.

It is also an object of the present invention to provide, for use in a metal framing structure or the like, an improved method and structure for assembling structural members together utilizing brackets having clamping portions adapted to fit over a structural member, which structural member may thereafter be expanded to form a tight fit thereof within the bracket.

It is also an object of the present invention to provide a metal framing structure embodying structural members so constructed that simple nailing operations may be used in the erection of parts of the structure.

Other objects and advantages of the present invention appear in the following description and in the appended claims.

In the drawings, throughout which corresponding reference characters are used to designate corresponding parts, Figure 1 is a detailed view of an illustrative stud and joist connection for balloon framing;

Fig. 2 is a detailed view of a connecting element hereinafter referred to as a "combination clip";

Fig. 3 is a detailed view of an illustrative rafter and gable jack stud connection;

Fig. 4 is a detailed view of a connecting element hereinafter called a "rafter clip";

Fig. 5 is a detailed view of an illustrative rafter tie connection;

Fig. 6 is a detailed view of a connecting element hereinafter called a "collar tie bracket";

Fig. 7 is a detailed view of an illustrative connection of a bearing partition parallel to a joist;

Fig. 8 is a detailed view of a connecting element hereinafter called a "joist hanger";

Fig. 9 is a detailed view of illustrative ceiling framing; and

Fig. 10 is a detailed view of an illustrative connection of stairway stringer.

In accordance with the present invention, a complete framing structure, for homes, as well as for a wide variety of other structures, may comprise a relatively few standard shapes. These structural shapes may be erected through use of a relatively few, economically formed attaching elements.

The structural members employed in the practice of the invention are preferably of the type disclosed in United States Patent No. 1,900,541, granted March 7, 1933 on application Serial No. 548,134, filed July 1, 1931 by the present applicant and George Buelow. As described and claimed in that patent, these members, which may be formed as either single or double web construction, are characterized as being formed of two angle or channel members arranged in back-to-back relation and rigidly secured together with the opposed and adjacent faces in spaced relation. These opposed and adjacent faces are corrugated in the direction of their length, the corrugations of one being complementary to the corrugations of the other. Those portions of members which are opposed and adjacent each other are of rigid and self-supporting character and they are so spaced with respect to each other as to form between them a sinuous slot of such character that when a nail of the character intended for use therewith is driven into the slot between the members in a direction transverse to the slot, the nail is caused to bend and approximately to follow the sinuosity of the slot to thereby positively fix the nail in position with respect to the members. With this construction, a substantial portion of the erection may be accomplished by simply nailing parts together in the manner now customary in the erection of wooden frame structures.

The connecting elements are preferably formed of stamped or pressed metal, this method of manufacture having been found to produce elements of sufficient rigidity and strength to meet usual building requirements, and to permit economical manufacture. Each of the hereinafter described attaching elements are formed to fit both narrow and wide studs and channel plates, thus making all parts interchangeable. Each of the brackets is also punched for various sizes of studs and channel plates.

The present connecting brackets are formed to fit over the flanges of the respective structural members, and are provided with ears which may be bent over and under such flanges. The combination of attaching elements or brackets of this character with structural members of the previously mentioned slotted type provides a substantial erection advantage. Preferably, the brackets are so formed that upon bending the ears around the flanges the brackets may be somewhat freely slid along the structural members, thus providing adjustability. The free or loose fit may also be made much more rapidly and simply than an initial tight fit of the bracket. After applying the bracket and bending the ears around the flanges, nails are inserted through the bracket openings and driven into the slots as described above. This driving action separates the two flanged portions of the structural members somewhat, forcing them into a tight and rigid fit within the bracket. It has been found in the practice of the present invention that the tight fit thus provided is sufficient for all requirements. If desired, however, and as illustrated in certain of the figures, an additional screw or bolt may be passed through the bracket and the structural member flanges.

As will appear more fully from the further description, the above mentioned structural members and connection elements may be assembled with ordinary carpenter's tools, in accordance with usual carpentry methods. A wide variety of relationships between the several structural members is possible, through use of the improved forms of connecting elements, permitting a wide range of architectural features with relatively few framing shapes. In an illustrative but not a limiting sense, a number of such typical relationships, which produce typical architectural features, are shown in the various figures of the drawings.

The connection shown in Fig. 1 is one frequently employed in balloon framing, and in this figure, floor joist 101 is secured to the flange of stud 105 by upper and lower clips 222 illustrated in detail in Fig. 2. As shown in the latter figure, clips 222 comprise two angularly connected plates 223 and 225, provided with ears 224 and 226, respectively. In applying the clips, the ears 226 are bent around and behind the flanges of stud 105 and the ear 224 is correspondingly bent around and behind the flange of joist 101. Thereafter, the nails 227 are driven through the holes in the bracket and into the slots in joist 101 and stud 105. This action spreads the flanges of these members and effects a rigid connection between them and the bracket. If desired, additional support may be provided by screws passed through the bracket openings such as 229 and through the stud and joist flanges. The connection thus provided between studs 105 and joist 101 is principally intended to prevent lateral or horizontal displacement between these members. For this reason, the load transmitted through the connection is not substantial. Both upper and lower clips may be used as shown in Fig. 1 or, alternatively, a single clip may be sufficient.

Figs. 3 and 4 are illustrative of a connection which may be variously employed, but which is particularly advantageous in connection with the erection of gable features. Referring particularly to Figs. 3 and 4, gable studs are secured in place by stud brackets 200, and clips 320, of the form shown in Fig. 4. Referring to Fig. 4, rafter clips 320 are preferably stamped from plane blanks, and include a U-shaped portion having legs 322 and a back 324; and an angularly disposed section 326 which extends upwardly from the back 324, and is provided with ears 328. Nailing openings 330 are provided in the legs 322 and in the extension 326. In erecting gable studs 108, the clips 320 are somewhat loosely applied thereto by bending the ears 328 around the flanges of stud 108. With studs 108 locked in place by stud brackets 200, each clip 320 is nailed to a rafter 112, the nails passing through openings 330 and into the flange slots, as described in connection with Figs. 1 and 2. Thereafter, legs 322 are nailed to studs 108, the nails passing through the corresponding openings 330 into the slots in the flanges of the studs, separating the flanges and tightening the joint. Prior to the nailing, the clip may be slid along stud 108 to compensate for any inaccuracy in the length thereof.

Referring particularly to Fig. 5, an illustrative rafter bracing arrangement is shown. In this figure, bracing between rafters is accomplished by I sections 370, secured to rafters 112 by collar tie brackets 372, and shown in detail in Fig. 6. The collar tie brackets are first fastened to collar ties, preferably while on carpenter's horses and are then put in position on the rafters. Thereafter, the ears may be bent around the rafter flanges and then nailed, in the previously described manner, forming a rigid joint.

Referring to Fig. 6, collar tie brackets 312 are of a somewhat box-like construction, and comprise a back plate 374, side walls 376, bent inwardly at right angles to wall 374 and end sections 378. The side walls 376 are formed with slightly cut away front surfaces 380 to allow for the irregularities of the web of a cooperating member. The end sections 378 are generally U-shaped, and are provided with depending ears 382, which extend forwardly from the leg sections. A stud 384 is secured, as by welding to the plate 374, and an opening 386 is provided in each end section 378. The end sections 378 are also provided with nail holes 388.

In applying bracket 372, referring again to Fig. 5, the flanges 390 of member 370 are cut and bent outwardly as shown, presenting a relatively plane surface for attachment to bracket 372. This attachment is loosely made by stud 384 and a nut 392, before raising the member 370. Thereafter the tie 370 is erected, the bracket ears 382 are turned under the rafter flanges, and nails driven through holes 388 into the rafter slot. Finally, nut 392 may be tightened on. If desired, screws such as 394 may be used to supplement the nailing.

It will be understood that bearing partitions parallel to a joist line are usually erected by securing a header joist to the main joist and running at right angles to the proposed partition. A channel plate may then be supported on the header joist, to form a lower sill for the partition, the partition studs being secured to the channel plate. Such an arrangement is shown in Fig. 7.

Referring particularly to Fig. 7, partition stud 106 is secured to channel plate 131 in the above described manner. Channel plate 131 in turn is secured to header joist 440 and header joist 440 is secured to floor joist 100 by a joist hanger 442, shown in detail in Fig. 8.

Referring to Fig. 8, joist hanger 442 is illustrated as being built up of three pressed metal sections 444, 446 and 448. Section 442 is of channel shape, the overall spacing between the flanges thereof being substantially equal to the inside flange dimensions of header joist 440. Sections 446 and 448 each comprise flat portions, pierced to provide nail and screw holes 450, and are provided with transversely extending legs 452, and downwardly bent, inwardly extending legs 454. The legs 454 are secured to the underside of the flanges of section 444, the spacing thus provided between each plate 448 or 446 and the flanges of section 444 being substantially equal to the flange thickness of joist 440.

Clip 442 is applied to joist 440 in the manner shown in Fig. 7 with the web of channel section 444 in engagement with and parallel to the web of joist 440, and the edge of section 444 abuts the web of joist 100. The flanges of joist 440 are received within the U-shaped spaces formed between channel 444 and plates 446 and 448. The ends of plates 446 and 448 extend beyond the flanges of joist 440, forming continuations thereof, and engage the flanges of the cooperating joist 100. The ears 452 are bent downwardly and turned in under the flanges of joist 100, and the ears 453 are turned under the flanges of joist 400. Nails may be driven through the appropriate openings 450 into the slots formed in joists 100 and 440, as described in connection with Figs. 1 and 2. Screws 456 may be used to secure hanger 442 to joist 440. In assembled position, the flange ends of joist 440 are level with and butt against the flanged edges of joist 100.

Ceiling framing for partitions parallel to joists may, for example, be effected as shown in Fig. 9, partition stud 106 being bolted within such channel plate 132. Channel plate 132 in turn is secured to two half-studs 490 and 492 by clips 494. Clips 494 are in all respects like the clips 222 described in connection with Fig. 2. In using the clips 492 in the relationship shown in Fig. 9, however, the ears 226, described in connection with Fig. 2, are not turned back but remain parallel with the main body portion of the clip. Referring again particularly to Fig. 9, the main body portion 496 of clip 494 is screwed to channel plate 132 by screw 498, and the associated portion 500 is nailed to the half-joist 490. The ear 502 is bent over and around the flange of half-joist 490.

An illustrative manner of erecting stair stringers is shown in Fig. 10. Referring to this figure, stairway stringer 122 is secured to stud 105 by a clip 494 of the type described in connection with Fig. 9, and is secured to a header joist 520 by a rafter plate 290. Header joist 520 in turn is secured to joist 100 by joist hangers 442 in the manner described in connection with Fig. 7.

Although specific embodiments of the present invention have been shown and described, it will be evident that various changes in the form, number and arrangement of elements may be made without departing from the spirit and scope thereof. The described embodiment, accordingly, is to be considered in an illustrative and not in a limiting sense.

What is claimed is:

1. In combination, first and second structural members, one having an expansible seat portion, a bracket for connecting said members together having a part which is seated upon said seat portion and a bendable ear bent over the edge of said seat portion, said ear being adapted to be bent over the edge of said seat portion after said part is placed thereon, means passed through said bracket into said seat portion so as to expand the seat portion into engagement with said ear, said bracket having an additional part extending from said mentioned part, and means connecting said additional part to said other member.

2. The method of forming a connection between two structural members, one having an expansible seat portion which comprises utilizing a bracket having a part disposed to seat upon said seat portion and a bendable ear, connecting said bracket to said other member, disposing said part on said seat portion, bending said ear over the edge of said seat portion, and expanding said seat portion into gripping engagement with said ear after said bending step.

3. In a structural unit, the combination of a first structural member having spaced interconnected flanges, a second structural member having correspondingly spaced interconnected expansible flanges, a bracket for connecting said members together comprising flange portions disposed to overlie and embrace the flanges of said first and second members, means interconnecting said flange portions so that said bracket may be fitted on to said second member from the side thereof, and means for connecting said bracket to said member including a holding element passed through said bracket into said second member to expand the flanges thereof into gripping engagement with said bracket.

4. In a structural unit, the combination of a first structural member having spaced interconnected flanges, a second structural member having correspondingly spaced interconnected expansible flanges, a bracket for connecting said members together comprising flange portions disposed to overlie and embrace the flanges of said first and second members, means interconnecting said flange portions so that said bracket may be fitted on to said second member from the side thereof, bendable ears formed on said flange portions and disposed to be bent around in embracing relation to the flanges of said second member, and means for connecting said bracket to said member including a holding element passed through said bracket into said second member to expand the flanges thereof into gripping engagement with said bracket.

5. In a structural unit, the combination of a first structural member having spaced interconnected flanges, a second structural member having correspondingly spaced interconnected expansible flanges, a bracket for connecting said members together comprising flange portions disposed to overlie and embrace the flanges of said first and second members, means interconnecting said flange portions so that said bracket may be fitted onto said second member from the side thereof, bendable ears formed on said flange portions and disposed to be bent around in embracing relation to the flanges of said first mentioned member, and a retaining element passed through each flange portion of said bracket into the expansible flange of said second member to expand the same and lock said bracket to said second member.

6. A connecting bracket for forming a connection between a structural member having spaced interconnected expansible flanges, and a second member, comprising spaced substantially parallel flange portions disposed to overlie the flanges of said structural member, said flange portions being interconnected to define a body of generally C shape whereby said bracket may be fitted onto said structural member from the side thereof, and means connecting said bracket to said members including a holding element passed into said structural member to spread the flanges thereof into gripping engagement with said bracket.

7. A connecting bracket for forming a connection between a structural member having spaced interconnected expansible flanges, and a second member, comprising spaced substantially parallel flange portions disposed to overlie the flanges of said structural member, said flange portions being interconnected to define a body of generally C shape whereby said bracket may be fitted onto said structural member from the side thereof, each said flange portion having a bendable ear formed to be bent around the corresponding flange after said bracket is fitted in place, and additional means connecting said bracket to said members including a holding element passed into said structural member to spread the flanges thereof into gripping engagement with said bracket.

8. A connecting bracket for forming a connection between a structural member having spaced interconnected expansible flanges, and a second member, comprising spaced substantially parallel flange portions disposed to overlie the flanges of said structural member, said flange portions being interconnected to define a body of generally C shape whereby said bracket may be fitted onto said structural member from the side thereof, said flange portions having lateral extensions thereon disposed to overlie the aforesaid second member, and means for connecting said bracket to said members including a holding element passed into said structural member to expand the flanges thereof into gripping engagement with said bracket.

9. In a structural connection, the combination of a pair of structural members one having a flange formed of two separable parts, and a bracket serving to connect said members together having a mid-portion disposed to overlie said flange and a bendable ear projecting from said mid-portion and bent around and in gripping relation behind said flange, said ear being formed so that it may be bent around said flange after said mid-portion is disposed on said flange, and a nail or like object passed through said flange and bracket so as to cause said flange to expand and bind said bracket, said bracket having an additional part extending from said mid-portion, and means connecting said additional part to the other structural member.

10. A connecting bracket for forming a connection between a first member having spaced flanges, and a second member, comprising a body of generally C shape having a web and spaced leg portions extending therefrom, said body being adapted to be fitted onto said first member from the side thereof so that said web extends between the flanges and said leg portions overlie the flanges respectively, each said leg portion having a bendable ear formed thereon to be bent around the corresponding flange after the bracket is fitted in place so as to wedge the bracket in place, and means secured to the web of the bracket for forming a pivotal connection between the bracket and the second member.

11. A connecting bracket for forming a connection between a first member having spaced flanges, and a second member, comprising a body of generally C shape having a web and spaced leg portions extending therefrom, said body being adapted to be fitted onto said first member from the side thereof so that said web extends between the flanges and said leg portions overlie the flanges respectively, each said leg portion having a bendable ear formed thereon to be bent around the corresponding flange after the bracket is fitted in place so as to wedge the bracket in place, and means secured to the web and projecting therefrom oppositely to the leg portions for pivotally securing the second member and the bracket together.

HENRY W. BUELOW.